United States Patent
Oikawa et al.

(10) Patent No.: US 12,265,228 B2
(45) Date of Patent: Apr. 1, 2025

(54) DISPLAY DEVICE, CONTROL METHOD THEREOF

(71) Applicant: CANON KABUSHIKI KAISHA, Tokyo (JP)

(72) Inventors: Makoto Oikawa, Kanagawa (JP); Ryo Yamasaki, Tokyo (JP); Kyouhei Suzuki, Tokyo (JP); Shunsuke Ninomiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/648,603

(22) Filed: Apr. 29, 2024

(65) Prior Publication Data

US 2024/0280822 A1 Aug. 22, 2024

Related U.S. Application Data

(62) Division of application No. 17/885,652, filed on Aug. 11, 2022, now Pat. No. 12,001,020.

(30) Foreign Application Priority Data

| Aug. 26, 2021 | (JP) | 2021-138299 |
| Jan. 13, 2022 | (JP) | 2022-003523 |

(51) Int. Cl.
  *G09G 5/00* (2006.01)
  *G02B 27/01* (2006.01)

(52) U.S. Cl.
  CPC ..... *G02B 27/0172* (2013.01); *G02B 27/0176* (2013.01); *G02B 2027/0154* (2013.01); *G02B 2027/0178* (2013.01)

(58) Field of Classification Search
  CPC ............ G02B 27/0172; G02B 27/0176; G02B 2027/0154; G02B 2027/0178
  USPC ............................................................ 345/8
  See application file for complete search history.

(56) References Cited

U.S. PATENT DOCUMENTS

| 2017/0102549 A1 | 4/2017 | Lee |
| 2017/0160798 A1 | 6/2017 | Lanman |
| 2018/0348860 A1 | 12/2018 | Lin |
| 2019/0129181 A1* | 5/2019 | Polcak ............... G02B 27/0093 |
| 2019/0258442 A1* | 8/2019 | Hudman ............ G02B 27/0176 |
| 2019/0369353 A1 | 12/2019 | Franklin |
| 2021/0055559 A1* | 2/2021 | Maric ................ G02B 27/0176 |

FOREIGN PATENT DOCUMENTS

JP 09-68670 A 3/1997

* cited by examiner

*Primary Examiner* — Jonathan M Blancha
(74) *Attorney, Agent, or Firm* — Cowan, Liebowitz & Latman, P.C.

(57) ABSTRACT

A display device includes a pair of display units each including displays 1R and 1L and ocular optical systems 2R and 2L. A first driving unit can change an optical positional relationship between the displays 1R and 1L and the ocular optical systems 2R and 2L. A second driving unit can change an interval between the pair of display units. An interpupillary distance adjustment unit adjusts the interval between the display units by the second driving unit in accordance with a detection result obtained by the interpupillary distance detector. After interpupillary distance adjustment is performed, a diopter adjustment unit performs diopter adjustment related to the display unit by the first driving unit.

20 Claims, 11 Drawing Sheets

DISPLAY DEVICE, CONTROL METHOD THEREOF

CROSS-REFERENCE TO RELATED APPLICATION

This application is a divisional of application Ser. No. 17/885,652, filed Aug. 11, 2022, the entire disclosure of which is hereby incorporated by reference.

BACKGROUND OF THE INVENTION

Field of the Invention

The present invention relates to a technique for interpupillary distance adjustment and diopter adjustment in a display device.

Description of the Related Art

Interpupillary distance adjustment in a display device is adjustment for changing an interval between right and left display units in accordance with a distance between a user's pupils. In addition, there is adjustment of a user's diopter and diopter adjustment according to a subject distance of a display image. For example, the power is adjusted at the eyepiece in accordance with the eyesight of a user. Japanese Patent Laid-Open No. H9-68670 discloses a configuration in which these adjustments are motorized. Do the motorization of the adjustment, a user does not need to manually perform adjustment, and the adjustment operation is automated as an operation of the display device.

However, in the display device disclosed in Japanese Patent Laid-Open No. H9-68670, the order of interpupillary distance adjustment and diopter adjustment is not clearly disclosed. For this reason, in a case where diopter adjustment is performed before interpupillary distance adjustment is performed, there is a possibility of a parallax deviating by the amount of deviation of a distance between the pupils with respect to the display unit, which causes a subject distance perceived by a user from the parallax to deviate by the amount of deviation. Details thereof will be described below using FIG. 8.

SUMMARY OF THE INVENTION

The present invention provides a display device capable of suppressing the occurrence of a deviation in a subject distance of an image at the time of displaying a video due to diopter adjustment being performed with an interpupillary distance deviating with respect to a display unit.

A display device according to an embodiment of the present invention includes a plurality of display units each configured to include a display and a display optical system, a first adjustment unit configured to change an optical positional relationship between the display and the display optical system, a detector configured to detect an interpupillary distance of a user, a second adjustment unit configured to change an interval between the plurality of display units in accordance with a detection result of the detector, and one or more processors configured to execute the instructions, which, when executed by the one or more processors, cause the display device to control the first adjustment unit to perform diopter adjustment related to the display unit, and control the second adjustment unit to perform adjustment corresponding to the interpupillary distance, in which the diopter adjustment in the first adjustment unit is performed after the adjustment corresponding to the interpupillary distance in the second adjustment unit is performed.

Further features of the present invention will become apparent from the following description of exemplary embodiments with reference to the attached drawings.

DESCRIPTION OF THE EMBODIMENTS

Figure 1:
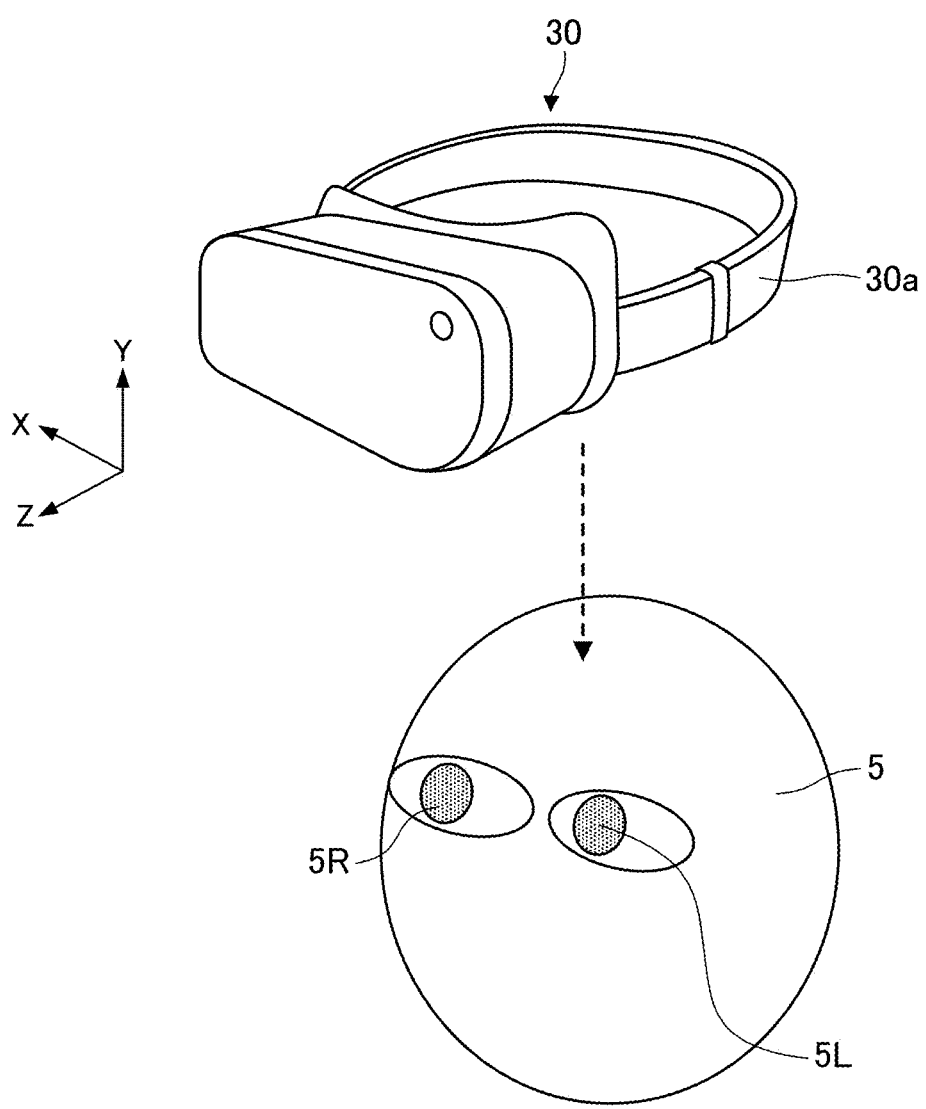
FIG. 1 is a schematic view illustrating an appearance of a video display device of the present embodiment.

Hereinafter, embodiments of the present invention will be described in detail with reference to the accompanying drawings. In the embodiments, a head-mounted display that is used by being worn on a user's head and can perform stereoscopic display and the like is described as an example of a display device.

First Embodiment

A first embodiment of the present invention will be described using FIG. 1 to FIG. 9C. In the drawings, an optical axis direction of a display optical system (hereinafter referred to as an ocular optical system) is defined as a Z-axis direction, a direction in which a right eye 5R and a left eye 5L of a user who is an observer are lined up is defined as an X-axis direction, and a direction orthogonal to the X-axis direction and the Z-axis direction is defined as a Y-axis direction. In the X-axis, the direction of the right eye 5R is defined as a +X direction, and the direction of the left eye 5L is defined as a −X direction. In the Y-axis, the direction of the user's head is defined as a +Y direction, and a direction opposite to the head is defined as a −Y direction. In the Z-axis, a direction in which the user is watching a video is defined as a +Z direction, and a direction opposite to the +Z direction is defined as a −Z direction.

FIG. 1 is a schematic view illustrating an appearance of the video display device according to the present embodiment. A video display device 30 includes a belt portion 30a for wearing the video display device 30 on a user's head 5. The user observes a display video of the video display device 30 with a right eye 5R and a left eye 5L.

Figure 2A:
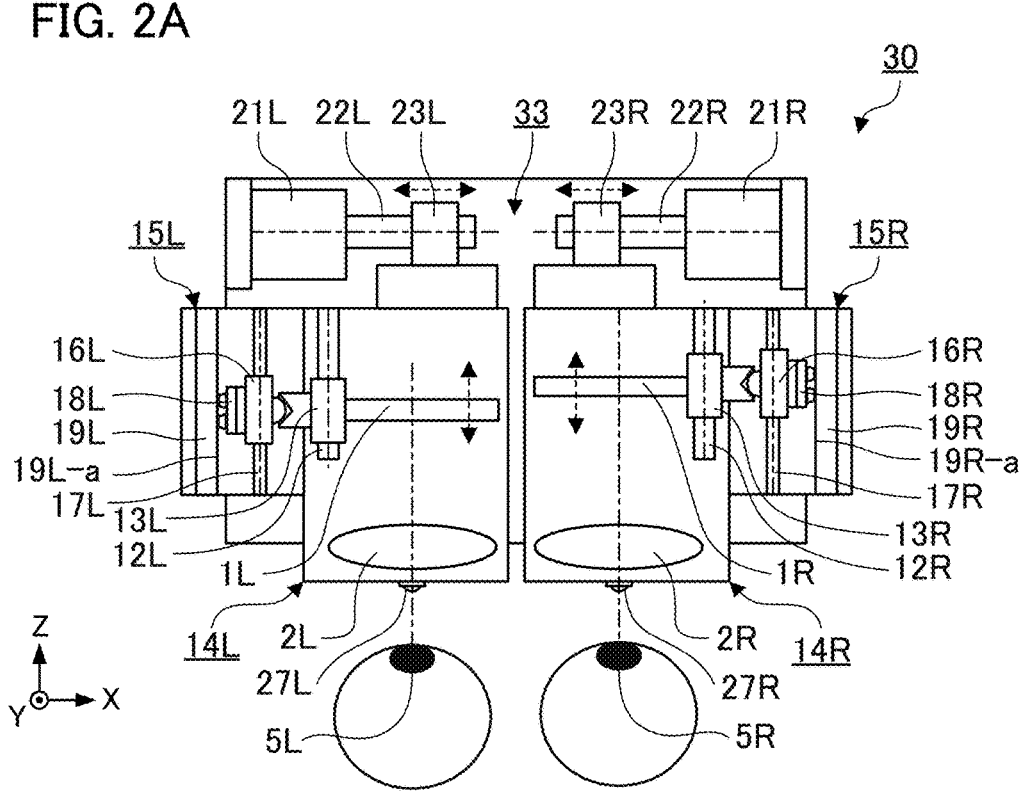
FIGS. 2A to 2C are diagrams illustrating a configuration of a video display device of a first embodiment.
Figure 2B:
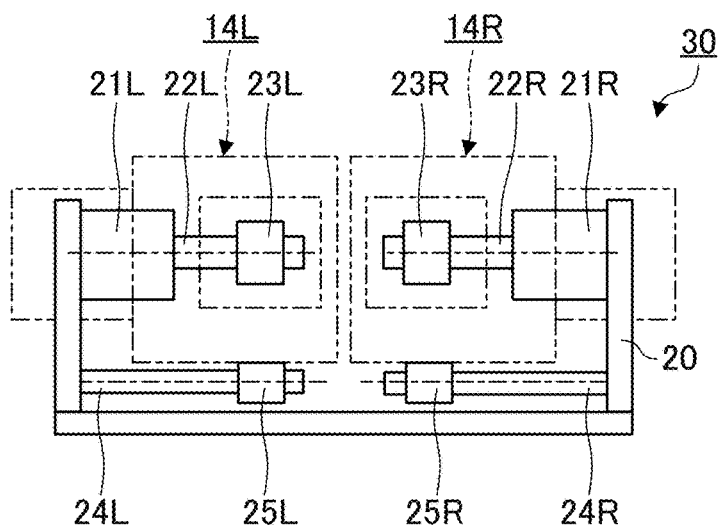
Figure 2C:
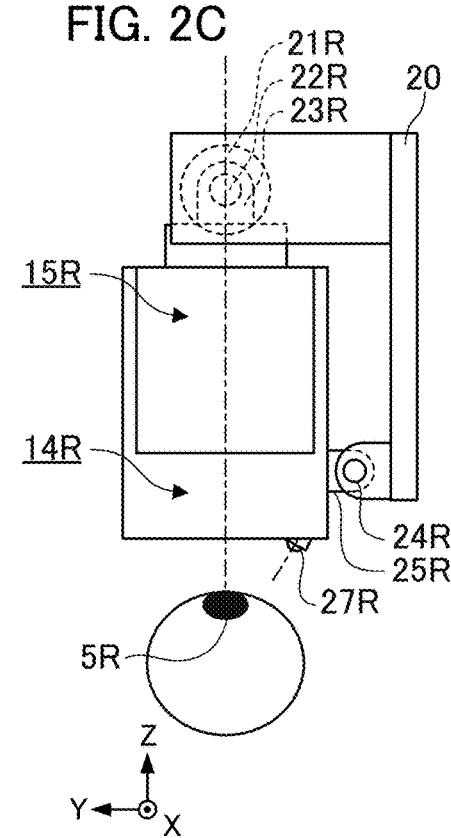

FIGS. 2A to 2C are diagrams illustrating a configuration of the video display device 30. FIG. 2A is a schematic view of the video display device 30 from the +Y direction. FIG. 2B is a schematic view of the video display device 30 from the −Z direction, and some components are indicated by an alternating two-dot/dash line. FIG. 2C is a schematic view of the video display device 30 from the +X direction.

First, a right eye video display unit 14R will be described. The right eye video display unit 14R includes a right eye display 1R, a guide shaft 12R, and a display holding member 13R. The right eye display 1R is held by the display holding member 13R and configured to be guided to the guide shaft 12R to be movable in the Z-axis direction. The right eye ocular optical system 2R is an optical system corresponding to the right eye 5R of the user. A display luminous flux of a video displayed on the right eye display 1R reaches the user's right eye 5R through the right eye ocular optical system 2R. The right eye display 1R is configured to be capable of performing diopter adjustment related to a display luminous flux that moves in the Z-axis direction along the guide shaft 12R and reaches the user's right eye 5R.

A right eye diopter adjustment unit 15R includes a vibrator holding member 16R, a guide shaft 17R, a vibrator 18R, and a friction member 19R. The vibrator 18R is, for example, a driving source that generates a driving force of an ultrasonic motor as a vibration member. The vibrator 18R can generate a driving force in the Z-axis direction with respect to the friction member 19R by generating a high-frequency elliptical motion at a contact portion with the friction member 19R and can move in the Z-axis direction with respect to the friction member 19R. The vibrator 18R is held by the vibrator holding member 16R. The vibrator holding member 16R is configured to be guided to the guide shaft 17R to be movable in the Z-axis direction.

In the present embodiment, the vibrator holding member 16R, the guide shaft 17R, the vibrator 18R, and the friction member 19R constitute the right eye diopter adjustment unit 15R. The vibrator 18R constitutes a first driving unit together with a vibrator 18L to be described below.

The vibrator holding member 16R is provided with a protrusion portion, and the display holding member 13R is provided with a V groove portion corresponding to the protrusion portion. The protrusion portion of the vibrator holding member 16R and the V groove portion of the display holding member 13R engage with each other, and the vibrator holding member 16R and the display holding member 13R move integrally in the Z-axis direction. That is, the right eye display 1R can move in the Z-axis direction by a driving force of the vibrator 18R in the Z-axis direction. Thereby, the right eye diopter adjustment unit 15R has a diopter adjustment function related to the right eye video display unit 14R. For example, in a case where the diopter of the right eye video display unit 14R is changed in the direction of infinity, the right eye display 1R moves in the +Z direction, and in a case where the diopter of the right eye video display unit 14R is changed in a close-range direction, the right eye display 1R moves in the −Z direction.

In diopter adjustment, it is necessary to reciprocate a diopter adjustment member frequently and with high accuracy according to a change in a subject distance in a display image. In the video display device 30, an ultrasonic motor that generates a thrust in the linear direction by high-frequency vibration of the vibrator 18R is used as a driving source of the right eye diopter adjustment unit 15R. Since the ultrasonic motor has a strong thrust and can directly drive the right eye display 1R without involving a deceleration mechanism, it is possible to reciprocate the right eye display 1R frequently and with high accuracy.

In the video display device 30, the right eye video display unit 14R and the right eye diopter adjustment unit 15R are disposed adjacent to each other in the X-axis direction. Since the right eye video display unit 14R is larger in size than the right eye diopter adjustment unit 15R in the Y-axis direction, a device size in the Y-axis direction depends on the size of the right eye video display unit 14R. Thus, even when the size of the right eye diopter adjustment unit 15R is reduced, the size of the video display device 30 is not reduced. On the other hand, the size of the video display device 30 can be reduced by an amount that the size of the right eye diopter adjustment unit 15R is reduced in the X-axis direction. That is, in order to reduce the size of the video display device 30, it is necessary to make the right eye diopter adjustment unit 15R smaller in the X-axis direction than in the Y-axis direction.

In the right eye diopter adjustment unit 15R, the vibrator 18R generates a driving force between the vibrator 18R and the friction member 19R by generating a high-frequency elliptical motion at a contact portion with the friction member 19R. For this reason, it is necessary to press and bias the vibrator 18R against the friction member 19R. The right eye diopter adjustment unit 15R includes a pressing member illustrated in the drawing. The pressing member is disposed adjacent to both sides of the vibrator 18R in the Y-axis direction and is disposed to overlap the vibrator 18R in the X-axis direction when viewed from the Y-axis direction. Thereby, it is possible to realize a reduction in the thickness of the right eye diopter adjustment unit 15R in the X-axis direction. Details of the pressing member will be described in embodiments to be described below.

The friction member 19R is disposed such that a normal direction of a friction surface 19R-a is parallel to the X-axis direction. With such disposition, the direction of a thinnest portion in the right eye diopter adjustment unit 15R is the X-axis direction, which contributes to a reduction in the size of the video display device 30.

The left eye video display unit 14L is configured to be symmetrical to the right eye video display unit 14R with respect to a surface parallel to a Y-Z plane. Thus, regarding components of the left eye video display unit 14L, it is assumed that signs with L attached instead of R of the components of the right eye video display unit 14R are used. Detailed description thereof will be omitted and can be understood by rereading the above description related to the right eye video display unit 14R and replacing the right eye with the left eye and R with L. This method of omitting description is the same in embodiments to be described below.

In the present embodiment, a vibrator holding member 16L, a guide shaft 17L, the vibrator 18L, and a friction member 19L constitute the left eye diopter adjustment unit 15L. In a case where the diopter of the left eye video display unit 14L is changed in the direction of infinity, a left eye display 1L moves in the +Z direction, and in a case where the diopter of the left eye video display unit 14L is changed in a close-range direction, the left eye display 1L moves in the −Z direction. In the video display device 30, the right eye diopter adjustment unit 15R and the left eye diopter adjustment unit 15L are provided separately, and thus the video display device 30 is configured such that the diopter can be adjusted individually in the right and left eyes. Thereby, appropriate diopter adjustment can be performed for a user having different eyesight between the right and left eyes. Note that, in the present embodiment, although an ultrasonic motor with high quietness is used as a driving source for the diopter adjustment units 15R and 15L, a driving method of the driving source is not limited, and a configuration in which a voice coil motor or the like is used may be adopted.

Next, an interpupillary distance adjustment unit 33 will be described. The interpupillary distance adjustment unit 33 includes motors 21R and 21L, lead screws 22R and 22L, and racks 23R and 23L. The motors 21R and 21L constitute a second driving unit.

The fixing member 20 holds the motor 21R on the right eye side and the motor 21L on the left eye side. The lead screw 22R is connected to the motor 21R, and the rack 23R engages with the lead screw 22R. The lead screw 22R rotates with the rotation of the motor 21R, and the right eye video display unit 14R fixed to the rack 23R is configured to move in the X-axis direction. In addition, the right eye video display unit 14R includes a guided portion 25R. The guided portion 25R engages with the guide shaft 24R fixed to the fixing member 20, and thus a guide mechanism in the X-axis direction is configured. The right eye video display unit 14R can move straight in the X-axis direction due to the driving of the motor 21R. Since the right eye video display unit 14R and the right eye diopter adjustment unit 15R are coupled to each other, the right eye video display unit 14R and the right eye diopter adjustment unit 15R can move integrally in the X-axis direction due to the driving of the motor 21R.

Regarding a mechanism portion on the left eye side related to interpupillary distance adjustment, detailed description thereof will be omitted and can be understood by replacing the sign R attached to the reference numerals with a sign L, and the right eye with the left eye in the above description. The left eye video display unit 14L can move straight in the X-axis direction due to the driving of the motor 21L. Since the left eye video display unit 14L and the left eye diopter adjustment unit 15L are coupled to each other, the left eye video display unit 14L and the left eye diopter adjustment unit 15L can move integrally in the X-axis direction due to the driving of the motor 21L. Note that, in the present embodiment, although the lead screw type motors 21R and 21L are used for a mechanism portion of interpupillary distance adjustment, a driving method of a driving source is not limited, and a configuration in which an ultrasonic motor, a voice coil motor, or the like is used may be adopted.

An interpupillary distance detection unit 27R is disposed at a position shifted from the optical axis of the right eye ocular optical system 2R in the −Y direction at an end of the right eye video display unit 14R in the −Z direction. The interpupillary distance detection unit 27R images the right eye 5R from an oblique direction with respect to the optical axis of the right eye video display unit 14R. Similarly, an interpupillary distance detection unit 27L is disposed at a position shifted from the optical axis of the left eye ocular optical system 2L in the −Y direction at an end of the left eye video display unit 14L in the −Z direction. The left eye video display unit 14L images the left eye 5L from an oblique direction with respect to the optical axis of the left eye video display unit 14L. A user's interpupillary distance is detected by detecting the positions of the right eye 5R and the left eye 5L from a plurality of pieces of image information obtained by the imaging of the interpupillary distance detection units 27R and 27L.

In the interpupillary distance adjustment unit 33, the motors 21R and 21L are driven based on the interpupillary distance which is a detection result of the interpupillary distance detection units 27R and 27L. The interpupillary distance adjustment unit 33 performs adjustment corresponding to the interpupillary distance by changing an interval between the right eye video display unit 14R and the left eye video display unit 14L by the driving of the motors 21R and 21L.

Figure 3:
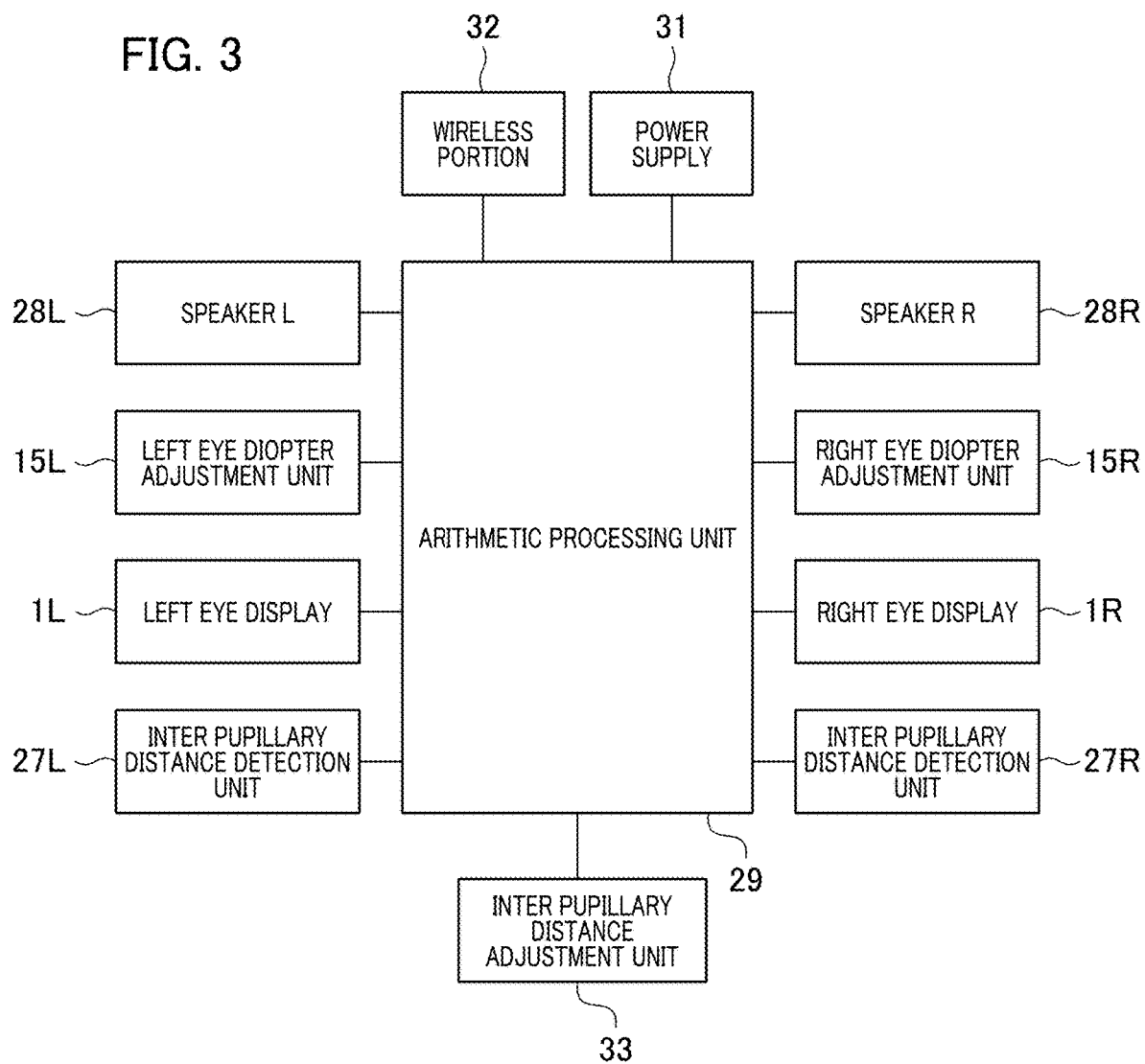
FIG. 3 is a block diagram illustrating the entire system of the video display device of the present embodiment.

Next, the video display device 30 will be described using FIG. 3. FIG. 3 is a block diagram illustrating a configuration of the entire system of the video display device 30. The video display device 30 includes an arithmetic processing unit 29 such as a central processing unit (CPU). The arithmetic processing unit 29 is connected to the right eye display 1R, the left eye display 1L, the right eye diopter adjustment unit 15R, the left eye diopter adjustment unit 15L, the interpupillary distance detection units 27R and 27L, and the interpupillary distance adjustment unit 33 to control the units.

The video display device 30 further includes a power supply 31, a wireless portion 32, and speakers 28R and 28L. Each unit is connected to the arithmetic processing unit 29. A user can watch content of a movie or the like on the video display device 30 by connecting to a network through the wireless portion 32.

Operations of the video display device 30 will be described with reference to FIGS. 4 to 7. Programs corresponding to flowcharts of FIGS. 4 to 7 are stored in a storage unit in the arithmetic processing unit 29. The following processing is realized by causing the CPU to execute the programs.

Figure 4:
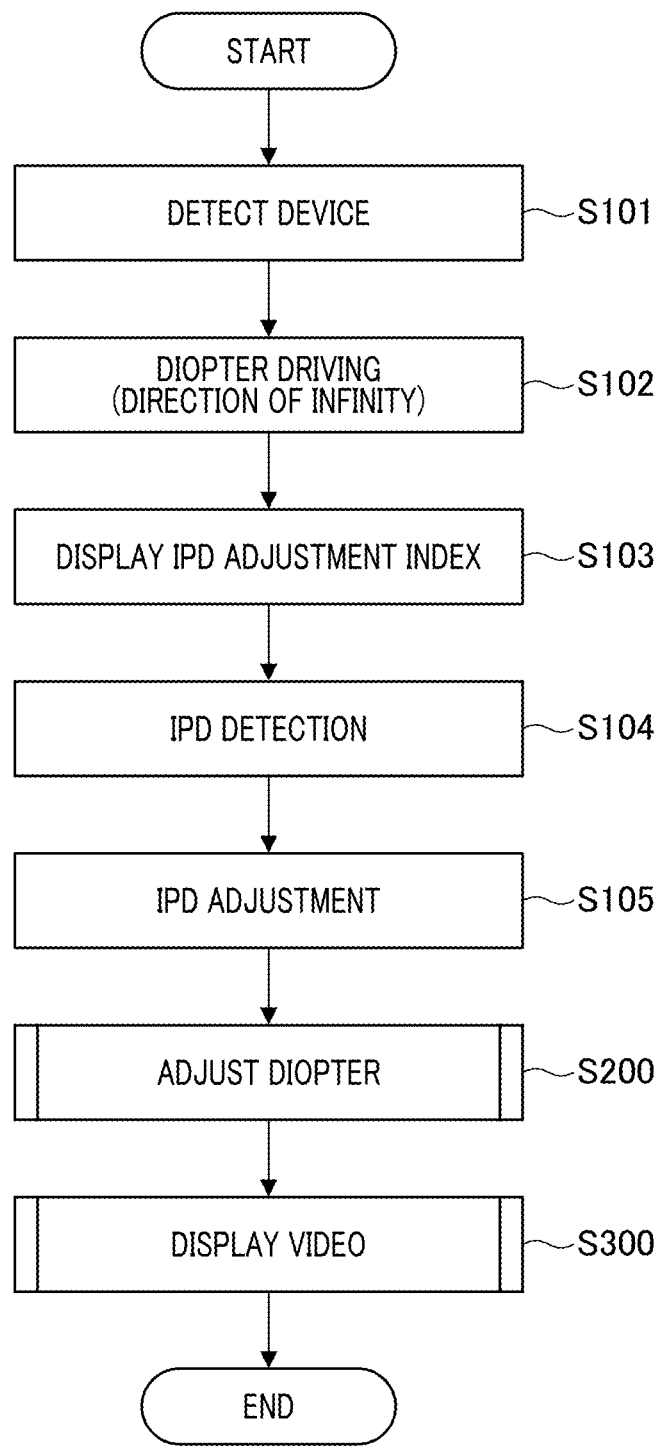
FIG. 4 is a flowchart illustrating operations in the present embodiment.

FIG. 4 is a flowchart illustrating operations of the entire system of the video display device 30. First, in S101, it is detected whether or not the video display device 30 is being worn on the user's head 5. It is detected whether or not the video display device 30 is being worn on the head 5 based on detection signals of the interpupillary distance detection units 27R and 27L. When the video display device 30 is worn on the user's head 5, the flow proceeds to the processing of S102.

In S102, processing for moving the diopters of the right eye video display unit 14R and the left eye video display unit 14L in the direction of infinity by a predetermined amount by the right eye diopter adjustment unit 15R and the left eye diopter adjustment unit 15L is performed. The right eye display 1R and the left eye display 1L move in the +Z direction. The video display units move to a position equivalent to infinity, or the video display units move to a position corresponding to a diopter shifted to a close point side by a predetermined amount from infinity in accordance with the user's eyesight.

In S103, the arithmetic processing unit 29 performs processing for displaying an index for adjusting an interpupillary distance (IPD) on the right eye display 1R and the left eye display 1L. IPD is an abbreviation for "interpupillary distance." An adjustment index that allows the user to face in the direction of infinity while the user is relaxed is displayed on each display.

In S104, the positions of the right eye 5R and the left eye 5L are detected from image information obtained by the imaging of the interpupillary distance detection units 27R and 27L, and processing for detecting the user's interpupillary distance is performed.

In S105, interpupillary distance adjustment is performed by changing an interval between the right eye video display unit 14R and the left eye video display unit 14L based on the interpupillary distance detected in S104. In the video display device 30, IPD detection in S104 is executed after movement in the direction of infinity by diopter driving (the direction of infinity) in S102. Thereby, an interpupillary distance can be detected in a state where the user's eyes are facing straight in the +Z direction. That is, it is possible to suppress the occurrence of a situation in which the user's eyes move inward and an interpupillary distance is not detected correctly.

In S200, the arithmetic processing unit 29 executes diopter adjustment processing. Diopter adjustment related to the right eye video display unit 14R and the left eye video display unit 14L is performed by changing an optical positional relationship between the displays 1R and 1L and the ocular optical systems 2R and 2L. In the next S300, the arithmetic processing unit 29 executes video display processing. Processing of displaying a video reproducing a parallax is performed based on a diopter according to a subject distance.

Next, diopter adjustment (FIG. 4: S200) will be described with reference to a flowchart of FIG. 5. First, in S210, diopter adjustment processing for the right eye is executed. The diopter on the right eye side is adjusted to match the eyesight of the user's right eye.

In S220, diopter adjustment for the left eye is executed. The diopter on the left eye side is adjusted to match the eyesight of the user's left eye. Then, the diopter adjustment is terminated. In the video display device 30, diopter adjustment is individually performed for the right eye and the left eye. Thereby, appropriate diopter adjustment can be performed for a user having different eyesight between the right and left eyes. Note that the order of S210 and S220 may be reversed, or the order of processing may be appropriately changed according to the user's dominant eye.

Next, the diopter adjustment (right eye) shown in S210 of FIG. 5 will be described with reference to a flowchart of FIG. 6. First, in S211, diopter driving processing in the direction of infinity is executed. The right eye diopter adjustment unit 15R changes the diopter related to the right eye video display unit 14R in the direction of infinity by a predetermined amount. In the driving in the direction of infinity, the right eye display 1R and the left eye display 1L are moved in the +Z direction. The displays are driven with the amount of movement to a position where the diopter is equivalent to infinity. Alternatively, the amount of movement may be determined such that a diopter position shifted from a position corresponding to infinity by a predetermined amount in accordance with the user's eyesight is set.

In S212, processing for displaying an index for adjusting a diopter is executed. The index for adjusting a diopter is displayed on the right eye display 1R. Regarding the index for adjustment, an easy-to-see checkerboard index is used, for example, so that the user can easily understand whether or not the diopter fits (high contrast and high edge sharpness). In addition, the right eye display 1R also displays information of a diopter position so that the user can select a position where the diopter fits in the selection of an optimum diopter position (right eye) shown in S215 to be described below.

In S213, diopter driving (1 step in a close-range direction) processing is executed, and a diopter position is changed in the close-range direction by one step. The right eye diopter adjustment unit 15R moves the right eye display 1R in the −Z direction in order to change the diopter position in the close-range direction.

In S214, processing for determining whether or not the diopter position has reached a close-range end is performed. In a case where it is determined that the diopter position has reached a close-range end, the flow proceeds to the processing of S215. Further, in a case where it is determined that the diopter position has not reached a close-range end, the flow returns to S212 to continuously display the index for adjustment.

In S215, processing for selecting an optimum diopter position is executed. The user selects a diopter position when the diopter fits best. In S216, diopter driving corresponding to the selected position is executed. The right eye diopter adjustment unit 15R performs diopter adjustment so that the diopter position selected in S215 is set. Then, the diopter adjustment (right eye) in S210 is terminated.

Figure 5:
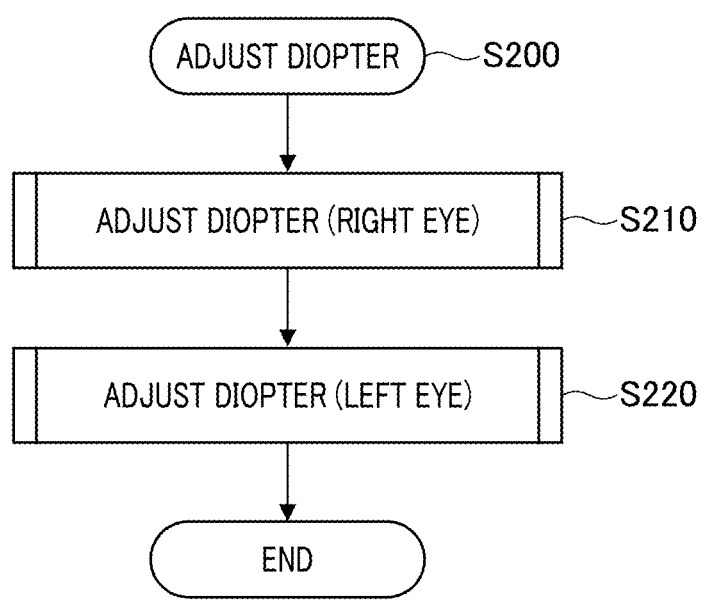
FIG. 5 is a flowchart illustrating diopter adjustment of right and left eyes.
Figure 6:
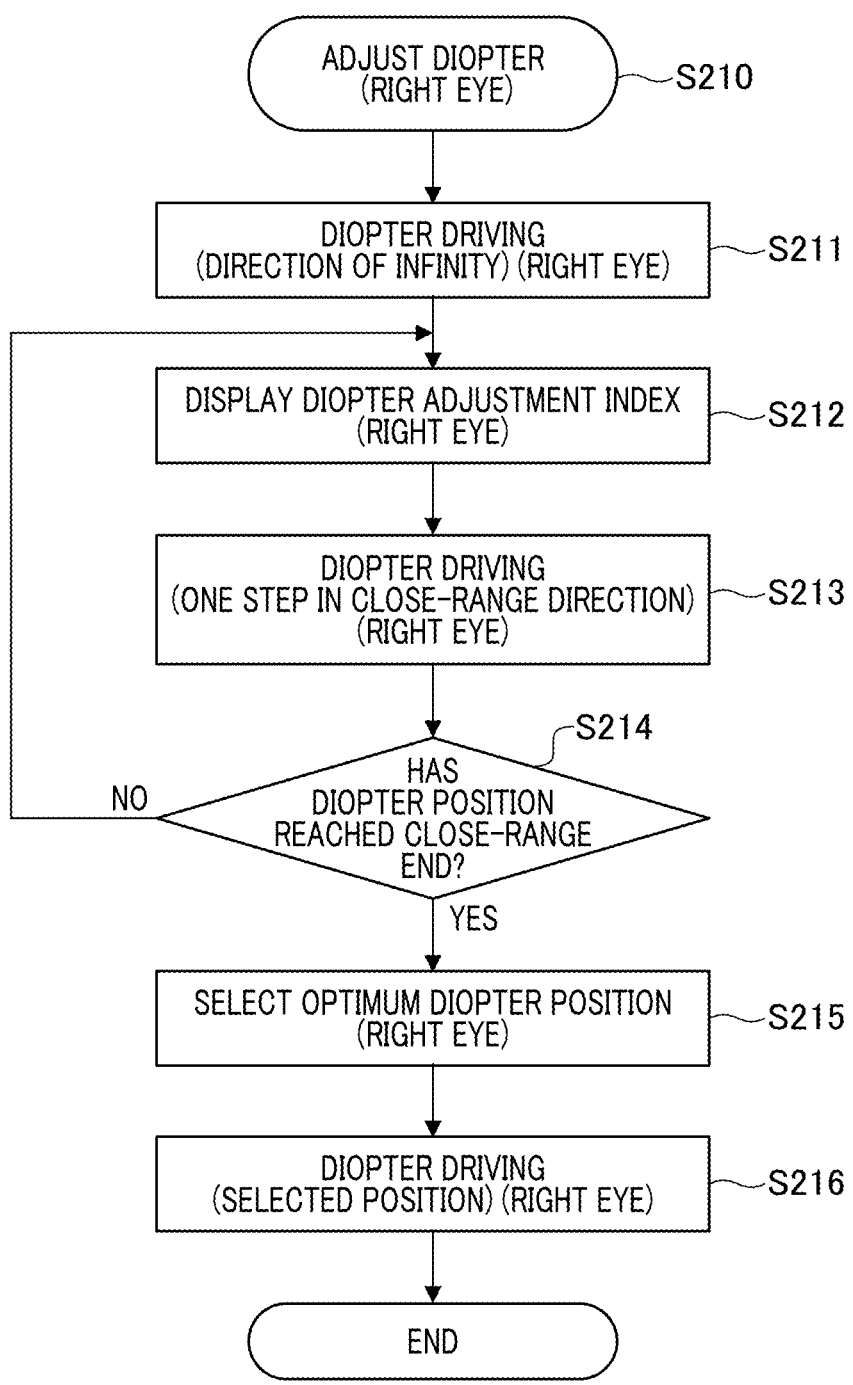
FIG. 6 is a flowchart illustrating diopter adjustment of a right eye.

The diopter adjustment (left eye) processing shown in S220 of FIG. 5 is similar to the diopter adjustment (right eye) processing shown in S210. Detailed description thereof will be omitted, and the right eye may be replaced with the left eye in the above description regarding S210.

The video display processing shown in S300 of FIG. 4 will be described with reference to a flowchart of FIG. 7. First, in S301, processing for acquiring a video and subject distance information is executed. The video display device 30 is connected to a network through the wireless portion 32. The arithmetic processing unit 29 acquires a video signal of a movie content and distance information corresponding to a subject included in the video signal.

The processing of S302 and S303 and the processing of S304 and S305 are executed in parallel. In S302, the arithmetic processing unit 29 determines a diopter position. A diopter position for a video displayed on the right eye video display unit 14R and the left eye video display unit 14L is determined based on the distance information of the subject which is acquired in S301. In S303, the arithmetic processing unit 29 executes diopter adjustment processing. The right eye diopter adjustment unit 15R and the left eye diopter adjustment unit 15L perform diopter adjustment based on the diopter position determined in S302.

In S304, the arithmetic processing unit 29 performs parallax determination processing. A parallax of the video displayed on the right eye video display unit 14R and the left eye video display unit 14L is determined based on the distance information of the subject which is acquired in S301. In S305, the arithmetic processing unit 29 executes processing for displaying a parallax video. The parallax video is a pair of right and left videos having different points of view. The right eye video display unit 14R and the left eye video display unit 14L display the parallax video based on the parallax determined in S304.

After S303 and S305 are terminated, the flow proceeds to the processing of S306. The arithmetic processing unit 29 performs determination regarding whether or not to terminate the video display. In a case where it is determined that the video display is terminated, the processing of S300 is terminated. Further, in a case where it is determined that the video display is not terminated, the flow returns to S301 to continue the processing.

As described above, the diopter adjustment processing (S303) and the parallax video display processing (S305) are repeatedly executed, and thus it is possible to display a video with a diopter and a parallax that match the subject distance of the display video. That is, it is possible to present a video that has a small deviation from the real world and does not give a sense of discomfort to the user.

In the video display device 30 of the present embodiment, the diopter adjustment processing in S200 is executed after the IPD adjustment processing in S105 of FIG. 4 is executed. Thereby, it is possible to display a video based on a relationship between a correct parallax and a subject distance. A problem in a case where diopter adjustment is performed before IPD adjustment will be described using FIG. 8.

Figure 8:
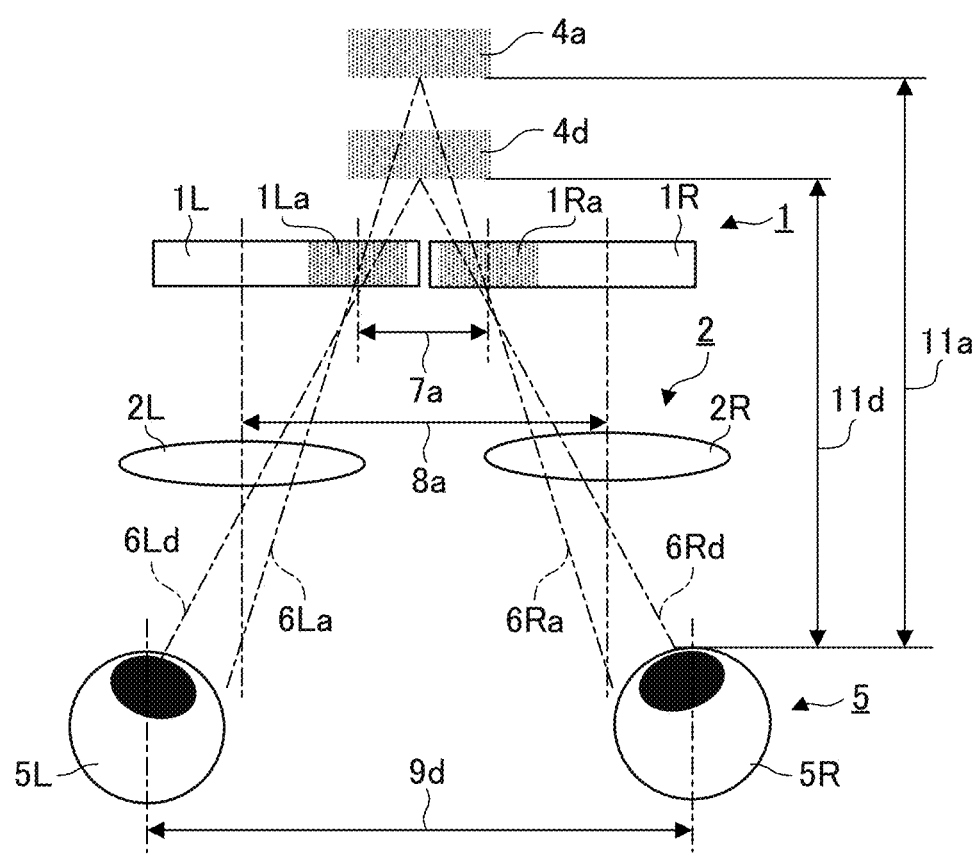
FIG. 8 is a diagram illustrating a problem to be solved.

FIG. 8 is a schematic view illustrating a video display device in the related art. A video display 1 includes a right eye display 1R and a left eye display 1L. The right eye display 1R displays a right eye display video 1Ra, and the left eye display 1L displays a left eye display video 1La. An interval 7a is an interval between the right eye display video 1Ra and the left eye display video 1La. An ocular optical system 2 includes a right eye ocular optical system 2R and a left eye ocular optical system 2L. An interval 8a is an interval between the right eye ocular optical system 2R and the left eye ocular optical system 2L. An interval 9d between a right eye 5R and a left eye 5L of a user is equivalent to an interpupillary distance.

FIG. 8 illustrates a state where IPD adjustment (FIG. 4: S105) has not been performed, and the interval 8a between the right eye ocular optical system 2R and the left eye ocular optical system 2L is different from the interpupillary distance 9d. An example in which the interpupillary distance 9d is larger than the interval 8a is shown.

In a case where there is an attempt to display a virtual image 4a at a subject distance 11a in the video display device of the related art, it is assumed that an interpupillary distance is consistent with the interval 8a between the right eye ocular optical system 2R and the left eye ocular optical system 2L. That is, an interval 7a between the right eye display video 1Ra and the left eye display video 1La is set in accordance with the assumption.

In a case where an interval between the right eye 5R and the left eye 5L is consistent with the interval 8a between the right eye ocular optical system 2R and the left eye ocular optical system 2L, luminous fluxes should reach a user's eyes as in a right eye observation luminous flux 6Ra and a left eye observation luminous flux 6La. However, in the video display device of the related art, the interpupillary distance 9d is larger than the interval 8a between the right eye ocular optical system 2R and the left eye ocular optical system 2L, and thus the right eye observation luminous flux 6Ra and the left eye observation luminous flux 6La do not reach the right eye 5R and the left eye 5L of the user. The luminous fluxes reaching the right eye 5R and the left eye 5L of the user are a right eye observation luminous flux 6Rd and a left eye observation luminous flux 6Ld. At this time, to the user, a virtual image 4d appears to be present at the position of a subject distance 11d where the right eye observation luminous flux 6Rd and the left eye observation luminous flux 6Ld intersect. For this reason, the subject distance 11a corresponding to a position where the video display device of the related art attempts to display the image and the subject distance 11d felt by the user are different.

In a case where the diopter adjustment (FIG. 4: S200) has been performed without performing the IPD adjustment (FIG. 4: S105), the interval 8a between the right eye ocular optical system 2R and the left eye ocular optical system 2L and the interpupillary distance 9d deviate from each other. When diopter adjustment is performed in a state where the interval 8a and the interpupillary distance 9d deviate from each other, the subject distance 11a corresponding to a position where the video display device attempts to display the image and the subject distance 11d felt by the user deviate from each other by the deviation of the interpupillary distance. That is, in the video display device of the related art, diopter adjustment is performed with an interpupillary distance deviating with respect to the video display unit, and there is a problem in that a subject distance deviates by the amount of deviation of the interpupillary distance.

Figure 9A:
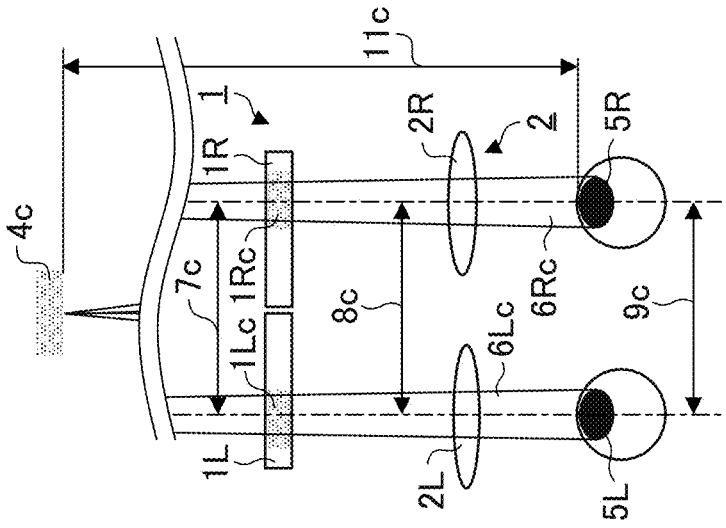
FIGS. 9A to 9C are diagrams illustrating effects of the present embodiment.
Figure 9B:
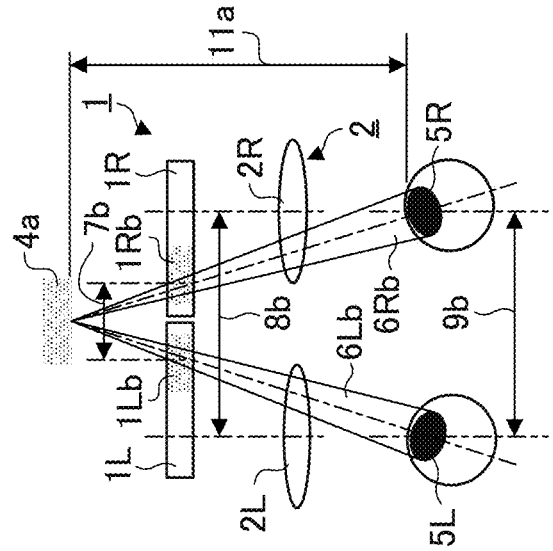
Figure 9C:
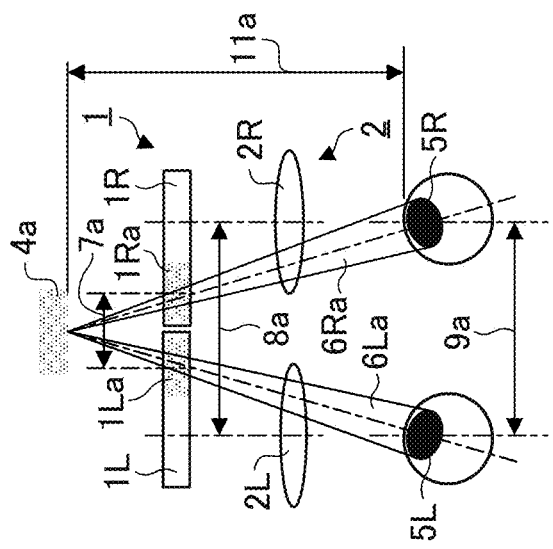

Next, the solution of the problem in the present embodiment will be described with reference to FIGS. 9A to 9C. FIGS. 9A to 9C are schematic views in a case where a video is presented at subject distances 11a, 11a, and 11c to a user having interpupillary distances 9a, 9b, and 9c.

In FIG. 9A, the user having the interpupillary distance 9a observes an image at the subject distance 11a. In the present embodiment, the IPD adjustment (FIG. 4: S105) is performed before the diopter adjustment (FIG. 4: S200) is performed. For this reason, the interpupillary distance 9a is consistent with the interval 8a between the right eye ocular optical system 2R and the left eye ocular optical system 2L. The video display device 30 displays the virtual image 4a at the subject distance 11a. In this case, assuming that the interpupillary distance is consistent with the interval 8a between the right eye ocular optical system 2R and the left eye ocular optical system 2L, the interval 7a between the right eye display video 1Ra and the left eye display video 1La is set. Luminous fluxes reaching the right eye 5R and the left eye 5L of the user are the right eye observation luminous flux 6Ra and the left eye observation luminous flux 6La. To the user, the virtual image 4a appears to be present at the position of the subject distance 11a where the right eye observation luminous flux 6Ra and the left eye observation luminous flux 6La intersect. For this reason, a subject distance corresponding to an image displayed on the video display device 30 and a subject distance actually felt by the user are consistent with each other at the distance 11a.

Next, a case where a user having the interpupillary distance 9b (>9a) observes a display video on the video display device 30 will be described with reference to FIG. 9B. The user having the interpupillary distance 9b observes a video at the subject distance 11a. In the present embodiment, the IPD adjustment (FIG. 4: S105) is performed before the diopter adjustment (FIG. 4: S200) is performed, and thus the interpupillary distance 9b is consistent with an interval 8b between the right eye ocular optical system 2R and the left eye ocular optical system 2L. The video display device 30 displays the virtual image 4a at the subject distance 11a. In this case, assuming that the interpupillary distance is consistent with the interval 8b between the right eye ocular optical system 2R and the left eye ocular optical system 2L, the interval 7b between the right eye display video 1Rb and the left eye display video 1Lb is set. Luminous fluxes reaching the right eye 5R and the left eye 5L of the user are a right eye observation luminous flux 6Rb and a left eye observation luminous flux 6Lb. To the user, the virtual image 4a appears to be present at the position of the subject distance 11a where the right eye observation luminous flux 6Rb and the left eye observation luminous flux 6Lb intersect. For this reason, a subject distance corresponding to an image displayed on the video display device 30 and a subject distance actually felt by the user are consistent with each other at the distance 11a.

As can be seen from FIGS. 9A and 9B, even when a user having different interpupillary distances wears the video display device 30 on his or her head, IPD adjustment is performed before diopter adjustment, and thus the interpupillary distance of the user and an interval between the right eye ocular optical system 2R and the left eye ocular optical system 2L are consistent with each other. A subject distance of an image displayed on the video display device 30 and a subject distance actually felt by the user can be made consistent with each other.

A case where a user having the interpupillary distance 9c observes a video at the subject distance 11c of the video display device 30 will be described with reference to FIG. 9C. In the present embodiment, IPD adjustment is performed before diopter adjustment, and thus the interpupillary distance 9c is consistent with an interval 8c between the right eye ocular optical system 2R and the left eye ocular optical system 2L. The video display device 30 displays a virtual image 4c at the subject distance 11c. In this case, assuming that the interpupillary distance is consistent with the interval 8c between the right eye ocular optical system 2R and the left eye ocular optical system 2L, an interval 7c between a right eye display video 1Rc and a left eye display video 1Lc is set. Luminous fluxes reaching the right eye 5R and the left eye 5L of the user are a right eye observation luminous flux 6Rc and a left eye observation luminous flux 6Lc. To the user, the virtual image 4c appears to be present at the position of the subject distance 11c where the right eye observation luminous flux 6Rc and the left eye observation luminous flux 6Lc intersect. For this reason, a subject distance corresponding to an image displayed on the video display device 30 and a subject distance actually felt by the user are consistent with each other at the distance 11c. In this manner, even when a subject distance of a display video has been changed, a subject distance of an image displayed on the video display device 30 and a subject distance actually felt by the user can be made consistent with each other. That is, IPD adjustment is performed before diopter adjustment, and thus the interpupillary distance and an interval between the right eye ocular optical system 2R and the left eye ocular optical system 2L are consistent with each other.

Next, the frequency of adjustment which is performed by the interpupillary distance adjustment unit 33 and each of the right eye diopter adjustment unit 15R and the left eye diopter adjustment unit 15L will be described. In a case where the wearing of the video display device 30 has been detected in the device detection (FIG. 4: S101), the interpupillary distance adjustment unit 33 executes IPD adjustment (FIG. 4: S105).

Figure 7:
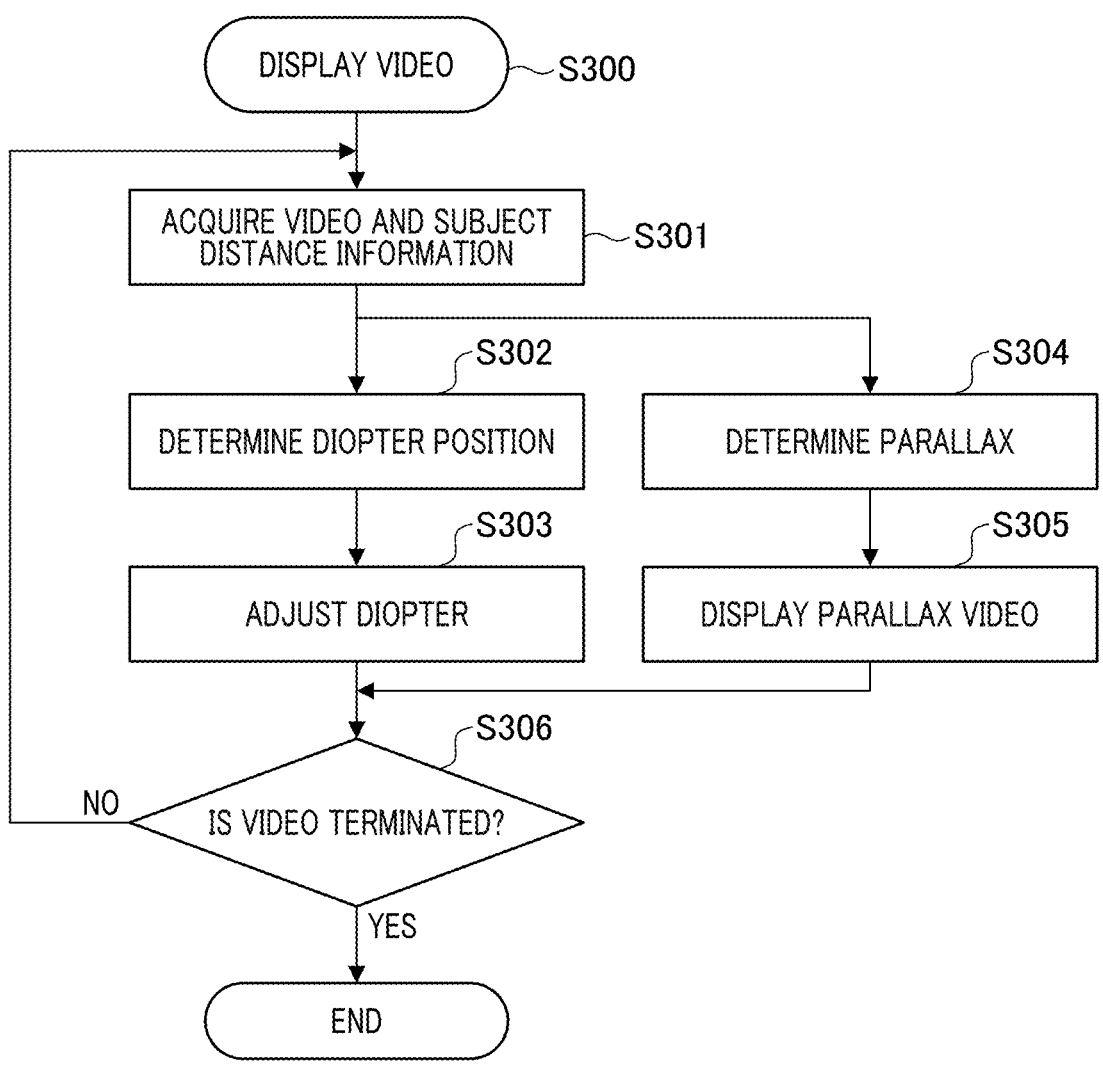
FIG. 7 is a flowchart illustrating video display processing.

On the other hand, the right eye diopter adjustment unit 15R and the left eye diopter adjustment unit 15L execute diopter adjustment (S303) at all times during the display of a video in FIG. 7. That is, the right eye diopter adjustment unit 15R and the left eye diopter adjustment unit 15L perform adjustment, that is, driving, more frequently than the interpupillary distance adjustment unit 33. In the video display device 30, as described in FIGS. 2A to 2C, the right eye diopter adjustment unit 15R performs adjustment by moving only the right eye display 1R and the display holding member 13R. On the other hand, the interpupillary distance adjustment unit 33 needs to drive (move) the right eye video display unit 14R and the right eye diopter adjustment unit 15R as a set. For this reason, the weight of a movable portion is smaller in the adjustment performed by the right eye diopter adjustment unit 15R than in the interpupillary distance adjustment.

Similarly, regarding the left eye side, the left eye diopter adjustment unit 15L performs adjustment by moving only the left eye display 1L and the display holding member 13L. On the other hand, the interpupillary distance adjustment unit 33 needs to drive (move) the left eye video display unit 14L and the left eye diopter adjustment unit 15L as a set. For this reason, the weight of a movable portion is smaller in the adjustment performed by the left eye diopter adjustment unit 15L than in the interpupillary distance adjustment. With a configuration in which the video display units and the diopter adjustment units are disposed in the movable portion of the interpupillary distance adjustment unit, it is possible to reduce the weight of the movable portion of the diopter adjustment unit which is frequently used, and realize a configuration capable of efficient driving.

According to the present embodiment, it is possible to realize a video display device capable of suppressing the occurrence of a deviation in a subject distance of an image at the time of displaying a video due to diopter adjustment being performed with an interpupillary distance deviating with respect to a video display unit.

Second Embodiment

Next, a second embodiment will be described with reference to FIGS. 10A to 10C. The present embodiment and the first embodiment differ in the position of the interpupillary distance adjustment unit 33. In the first embodiment, the interpupillary distance adjustment unit 33 is disposed adjacent to the right eye video display unit 14R and the left eye video display unit 14L in the +Z direction.

On the other hand, in the present embodiment, the interpupillary distance adjustment unit 33 is disposed adjacent to the right eye video display unit 14R and the left eye video display unit 14L in the +Y direction. Thereby, there is an advantage that the video display device 30 can be made smaller in the Z-axis direction than in the first embodiment. In the present embodiment, the same components as those in the first embodiment are denoted by the reference numerals and signs that have already been used, and thus detailed description thereof will be omitted, and differences from the first embodiment will be described. A method of omitting description is the same in embodiments to be described below.

Figure 10A:
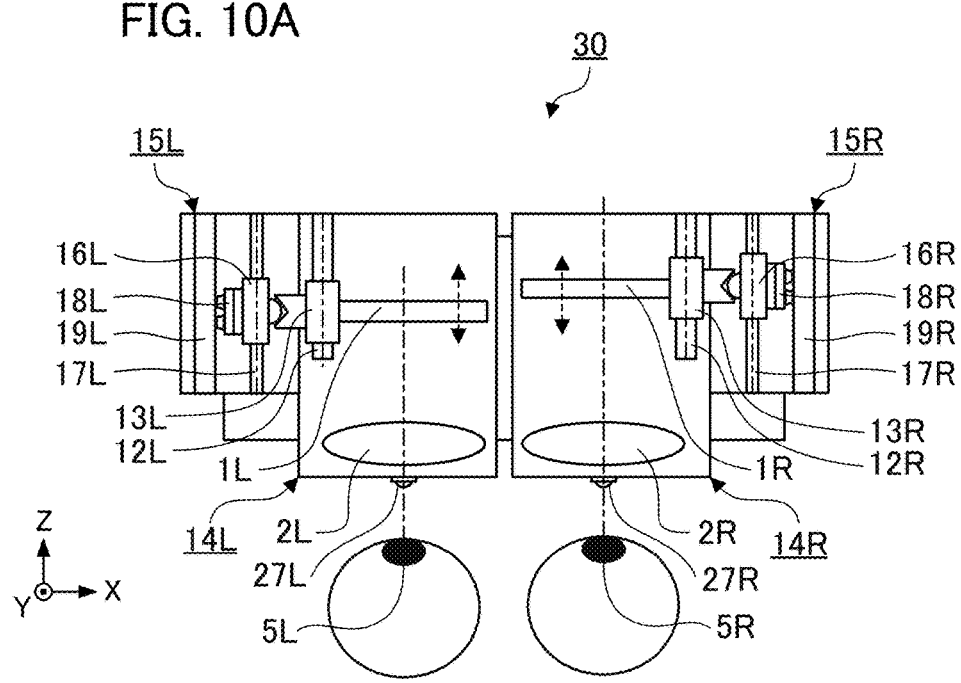
FIGS. 10A to 10C are diagrams illustrating a configuration of a video display device of a second embodiment.
Figure 10B:
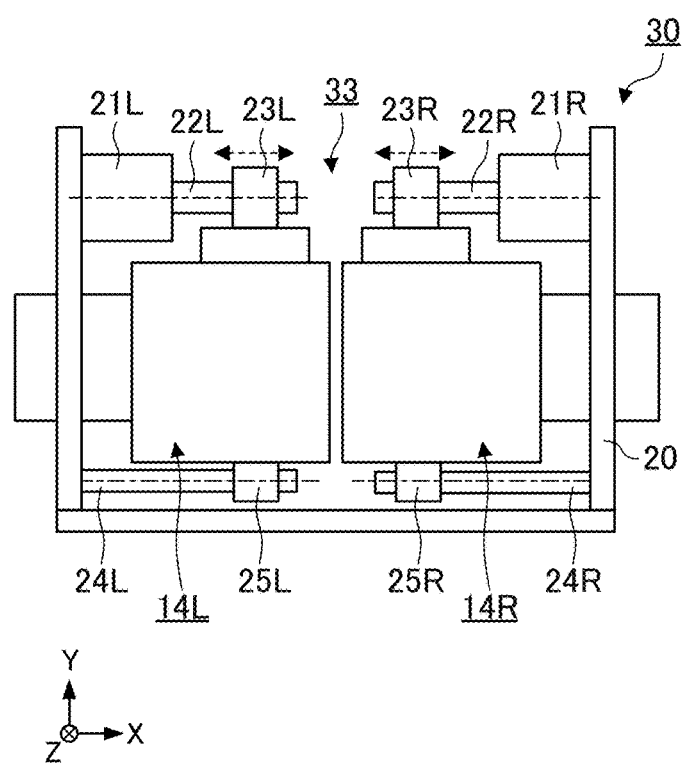
Figure 10C:
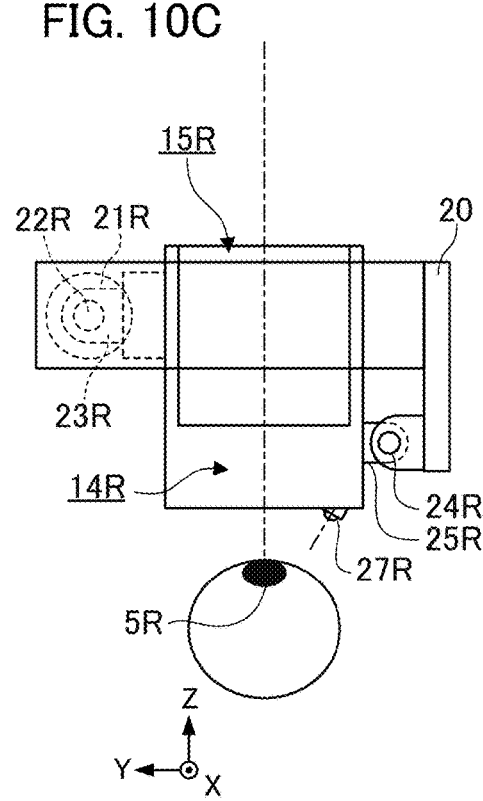

FIGS. 10A to 10C are diagrams illustrating a configuration of the video display device 30 according to the present embodiment. FIG. 10A is a schematic view in a case where the video display device 30 is viewed from the +Y direction, and FIG. 10B is a schematic view in a case where the video display device 30 is viewed from the −Z direction. FIG. 10C is a schematic view in a case where the video display device 30 is viewed from the +X direction.

In the first embodiment, as described in FIG. 2A, the interpupillary distance adjustment unit 33 is disposed at a position adjacent to the right eye video display unit 14R and the left eye video display unit 14L in the +Z direction. On the other hand, as illustrated in FIG. 10A, in the present embodiment, the interpupillary distance adjustment unit 33 is not present at a position adjacent to the right eye video display unit 14R and the left eye video display unit 14L in the +Z direction in the video display device 30. That is, the video display device 30 can be made small in the Z-axis direction by that amount.

In the example of FIG. 10A, a method of displaying only a video in a virtual space on the right eye display 1R and the left eye display 1L is used. There is a mixed reality (MR) device equipped with a pair of cameras for capturing a real-world video and displaying a real-time video in the real world and a video in a virtual space in combination. In this case, when the positions of the pair of cameras and a user's both eyes deviate from each other significantly, there is a possibility that the parallax and size may differ significantly. In a case where the sense of distance changes significantly between a video obtained by the pair of cameras and the real world actually viewed by the user's both eyes, the user who sees a video in which a virtual video and a real world video are combined may feel uncomfortable. In order to realize a combined video with less sense of discomfort by the MR device, it is necessary to reduce the sense of distance between the real world video obtained from the pair of cameras and the real world video viewed by the user's both eyes as much as possible. To do this, it is preferable to dispose the pair of cameras at positions as close to the user's both eyes as possible. Another advantage of reducing the size of the video display device 30 in the Z-axis direction is that it is easy to dispose the cameras as close to the user's both eyes as possible when this technology is applied to the MR device. According to the present embodiment, it is possible to reduce the sense of distance between a real world video acquired using the pair of cameras and a real world video viewed by the user's both eyes and to realize a mixed reality video with less sense of discomfort.

In FIG. 10B, the motors 21R and 21L, the lead screws 22R and 22L, and the racks 23R and 23L constituting the interpupillary distance adjustment unit 33 are disposed at positions adjacent to the right eye video display unit 14R and the left eye video display unit 14L in the +Y direction.

This is a configuration in which the lead screw 22R rotates by the rotation of the motor 21R fixed to the fixing member 20, and the right eye video display unit 14R fixed to the rack 23R is movable in the X-axis direction. In addition, the right eye video display unit 14R includes the guided portion 25R. The guided portion 25R engages with the guide shaft 24R fixed to the fixing member 20, and thus a guide mechanism in the X-axis direction is configured. Thereby, the right eye video display unit 14R is configured to be movable straight in the X-axis direction by the motor 21R.

Since the right eye video display unit 14R and the right eye diopter adjustment unit 15R are coupled to each other, the right eye video display unit 14R and the right eye diopter adjustment unit 15R are configured to be integrally movable in the X-axis direction due to the driving of the motor 21R. Also in the present embodiment, a driving method of each motor is not limited similarly to the first embodiment.

Regarding a mechanism portion on the left eye side related to interpupillary distance adjustment, the sign R attached to the reference numerals in the above description may be replaced with a sign L, and the right eye may be reread as a left eye, and thus detailed description thereof will be omitted.

According to the present embodiment, in addition to the effects of the first embodiment, an effect of contributing to a reduction in the size of the video display device 30 in the Z-axis direction is exhibited.

Third Embodiment

A third embodiment will be described with reference to FIG. 11. The present embodiment and the second embodiment are different in that the positions of the vibrator 18R and the friction member 19R in the X-axis direction are replaced with each other. In the second embodiment (see FIGS. 10A to 10C), the vibrator 18R is disposed on a first side close to the right eye video display unit 14R, and the friction member 19R is disposed on a second side distant from the right eye video display unit 14R. On the other hand, in the present embodiment, the friction member 19R is disposed on the first side, and the vibrator 18R is disposed on the second side. According to this configuration, the vibrator 18R having a large characteristic change due to temperature can be kept further away from the right eye display 1R which is a heat generation source than in the second embodiment. Even during long-time use, characteristics of the vibrator 18R are unlikely to change due to heat from the right eye display 1R, and thus diopter adjustment can be performed more stably. Other differences will be specifically described with reference to FIGS. 11A and 11B. In the present embodiment, the same components as those in the second embodiment are denoted by the reference numerals and signs that have already been used, and thus detailed description thereof will be omitted.

Figure 11A:
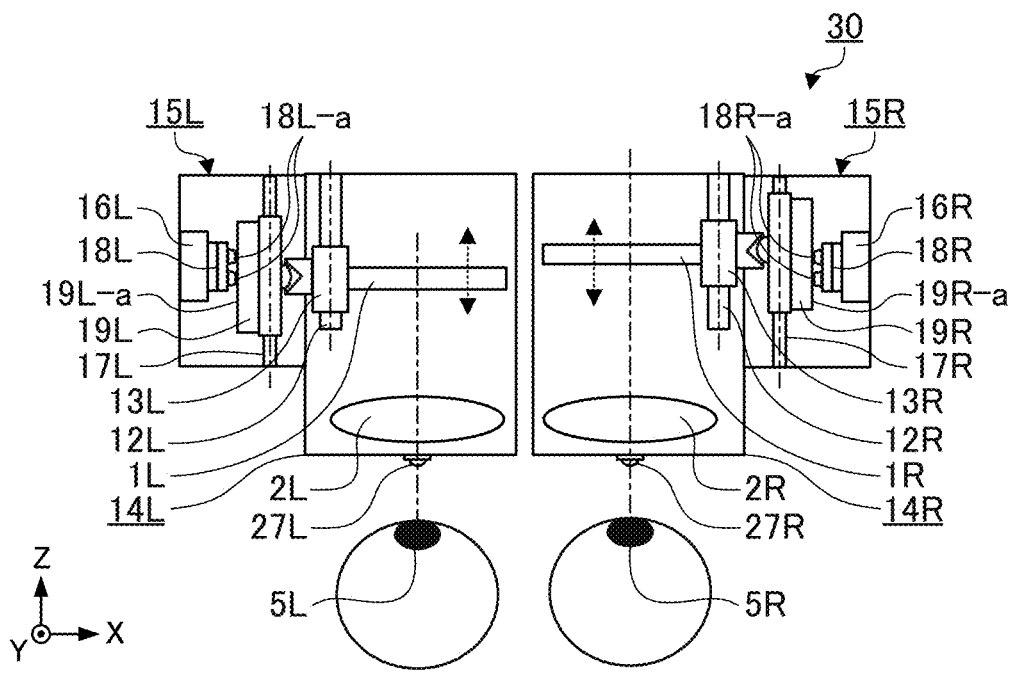
FIGS. 11A and 11B are diagrams illustrating a configuration of a video display device of a third embodiment.

FIG. 11A is a diagram when the video display device 30 of the present embodiment is viewed from the +Y direction.

Figure 11B:
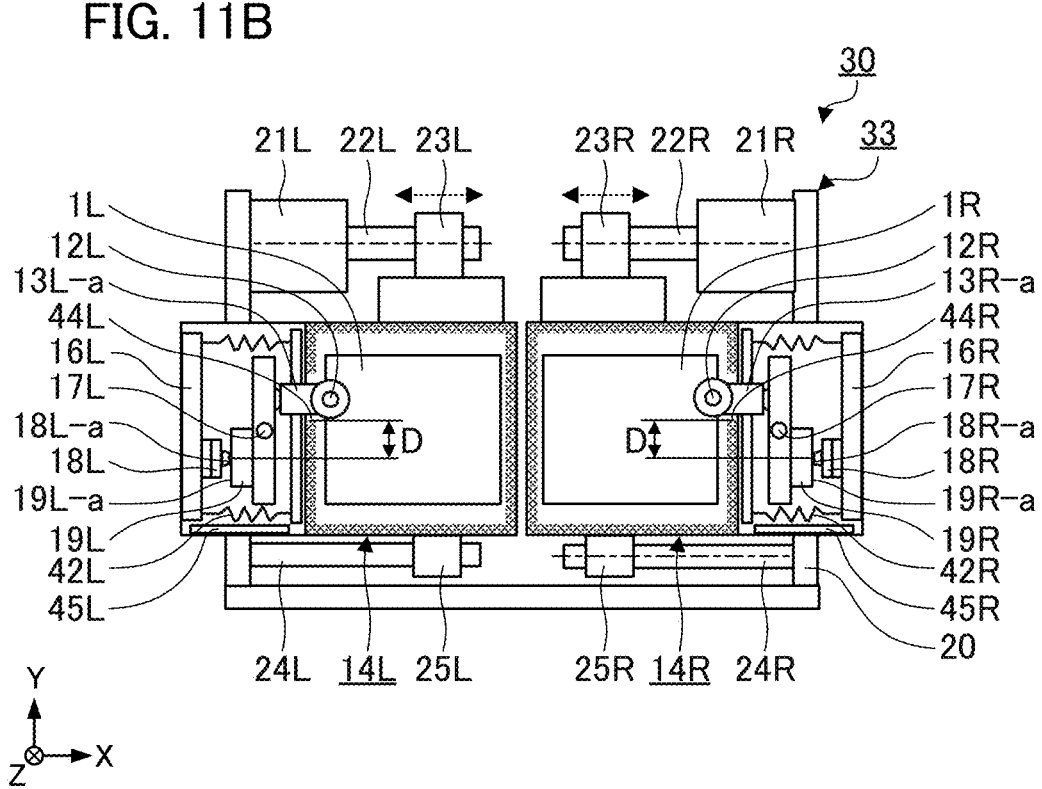

FIG. 11B is a diagram when the video display device 30 of the present embodiment is viewed from the -Z direction. The right eye diopter adjustment unit 15R includes the vibrator holding member 16R, the guide shaft 17R, the vibrator 18R, and the friction member 19R. In the second embodiment, a configuration in which the vibrator holding member 16R is guided to the guide shaft 17R to be movable in the Z-axis direction is adopted. In the present embodiment, a configuration in which the friction member 19R is guided to the guide shaft 17R to be movable in the Z-axis direction is adopted.

The vibrator holding member 16R, the guide shaft 17R, the vibrator 18R, and the friction member 19R constitute the right eye diopter adjustment unit 15R. The vibrator 18R constitutes a first driving unit together with the vibrator 18L.

A protrusion portion is provided on the first side of the friction member 19R, and the display holding member 13R is provided with a V groove portion corresponding to a protrusion portion. The protrusion portion of the friction member 19R and the V groove portion of the display holding member 13R engage with each other, and the friction member 19R and the display holding member 13R integrally move in the Z-axis direction. Thereby, the right eye diopter adjustment unit 15R has a diopter adjustment function related to the right eye video display unit 14R. For example, in a case where the diopter of the right eye video display unit 14R is changed in the direction of infinity, the right eye display 1R moves in the +Z direction, and in a case where the diopter of the right eye video display unit 14R is changed in a close-range direction, the right eye display 1R moves in the -Z direction.

In the right eye diopter adjustment unit 15R, the vibrator 18R is constituted by a piezoelectric element, and thus a characteristic change due to temperature is relatively large. On the other hand, the friction member 19R is formed of a metal, and thus a characteristic change due to temperature is relatively small. In addition, the right eye display 1R is a member of which the temperature rises in accordance with the amount of heat generated. A case where the vibrator 18R having a large characteristic change due to temperature is disposed at an area close to a heat generation source is assumed. In this case, there is a possibility that driving characteristics of the right eye diopter adjustment unit 15R will change during long-time use. Consequently, in the present embodiment, the friction member 19R is disposed at a position close to the right eye display 1R, which is a heat generation source, in the X-axis direction, and the vibrator 18R is disposed at a position distant from the right eye display 1R. Thereby, it is possible to suppress a change in driving characteristics of the right eye diopter adjustment unit 15R even during long-time use.

In the video display device 30, the right eye video display unit 14R and the right eye diopter adjustment unit 15R are disposed adjacent to each other in the X-axis direction. A relationship between the sizes of the right eye video display unit 14R and the right eye diopter adjustment unit 15R is the same as in the above-described embodiment. In order to reduce the size of the video display device 30, it is necessary to make the right eye diopter adjustment unit 15R smaller in the X-axis direction than in the Y-axis direction.

In the right eye diopter adjustment unit 15R, in a case where a driving force for the friction member 19R is generated by a high-frequency elliptical motion occurring at a contact portion between the vibrator 18R and the friction member 19R, it is necessary to press and bias the vibrator 18R against the friction member 19R. For this reason, as illustrated in FIG. 11B, the right eye diopter adjustment unit 15R includes a pressing member 42R. For example, the pressing member 42R includes a biasing member such as an elastic body. The pressing member 42R is disposed adjacent to both sides of the vibrator holding member 16R in the Y-axis direction. When viewed from the Y-axis direction, the pressing member 42R is disposed to overlap the vibrator 18R in the X-axis direction. Thereby, it is possible to realize a reduction in the thickness of the right eye diopter adjustment unit 15R in the X-axis direction.

The friction member 19R is disposed such that a normal direction of the friction surface 19R-a is parallel to the X-axis direction. With such disposition, the direction of a thinnest portion in the right eye diopter adjustment unit 15R is the X-axis direction, which contributes to a reduction in the size of the video display device 30.

In the present embodiment, a connection member 13R-a connecting the right eye display 1R and the right eye diopter adjustment unit 15R and an opening 44R for making the connection member 13R-a pass therethrough are provided. The opening 44R is formed in a side surface of the right eye video display unit 14R in the +X direction. The vibrator 18R is in contact with the friction surface 19R-a of the friction member 19R at a contact portion 18R-a. At the time of use, the position of the opening 44R is a position in a vertically upward direction (+Y direction) with respect to the contact portion 18R-a in the Y-axis direction. The opening 44R is provided in a vertically upward direction with respect to the contact portion 18R-a, and thus it is possible to prevent abrasion powder generated in the contact portion 18R-a during use from infiltrating into the right eye video display unit 14R.

In a driving mechanism portion for diopter adjustment (right eye), a driven portion is the right eye display 1R, and a movable portion is the friction member 19R. The connection member 13R-a provided in the display holding member 13R connects the right eye display 1R and the friction member 19R. The connection member 13R-a plays a role of transmitting a driving force generated between the vibrator 18R and the friction member 19R to the right eye display 1R and integrally moving the friction member 19R and the right eye display 1R in the Z-axis direction.

The right eye video display unit 14R is configured such that a peripheral portion is covered with a cover in order to prevent dust or the like from infiltrating thereinto, and the opening 44R corresponding to a location where the connection member 13R-a passes is formed. The contact portion 18R-a of the vibrator 18R and the friction member 19R move relatively while sliding, and abrasion powder generated in the contact portion 18R-a at that time is likely to reach the right eye display 1R through the opening 44R. A countermeasure for suppressing a significant deterioration of the quality of a video due to the influence of the reached abrasion powder on a display screen of the right eye display 1R is required.

In the present embodiment, a configuration in which the opening 44R is disposed in a vertically upward direction (+Y direction) with respect to the contact portion 18R-a at a distance D is adopted. It is possible to prevent abrasion powder generated in the contact portion 18R-a during use from reaching the right eye display 1R through the opening 44R, and thus a high quality display video can be provided.

In addition, abrasion powder is generated due to the sliding of the vibrator 18R and the friction member 19R only when a user is watching a video while wearing the video display device 30. Consequently, in the present embodiment, a configuration in which the adhesive member 45R is disposed at a predetermined position in a vertically downward direction (−Y direction) with respect to the contact portion 18R-a is adopted. The adhesive member 45R has an adhesive surface. Abrasion powder generated in the contact portion 18R-a during use falls in a vertically downward direction (−Y direction) with respect to the contact portion 18R-a due to gravity and is adsorbed onto the adhesive member 45R. By disposing the adhesive member 45R in a vertically downward direction with respect to the contact portion 18R-a during use, the adhesive member 45R adsorbs the falling abrasion powder while the user is wearing the video display device 30 and watching a video. It is possible to adsorb the abrasion powder by the adhesive member 45R before the abrasion powder diffuses into the right eye diopter adjustment unit 15R.

As described above, the abrasion powder is adsorbed by the adhesive member 45R while the user is wearing the video display device 30 and watching a video. For example, a case where the video display device 30 is in a posture different from the posture illustrated in FIG. 11B after the user has watched the video is assumed. In this case, even when the position of the opening 44R is not a position in a vertically upward direction with respect to the contact portion 18R-a, the adhesive member 45R has already adsorb the abrasion powder, and thus it is possible to prevent the abrasion powder from infiltrating into the right eye video display unit 14R from the opening 44R.

In the video display device of the embodiment, diopter adjustment is performed after interpupillary distance adjustment is performed, and thus it is possible to make an interpupillary distance and an interval between right and left ocular optical systems consistent with each other. In addition, it is possible to make a subject distance of an image displayed on the video display device and a subject distance actually felt by a user consistent with each other. Thus, it is possible to realize a video display device capable of suppressing the occurrence of a deviation in a subject distance of an image when diopter adjustment is performed with an interpupillary distance deviating with respect to a video display unit.

In the embodiment, an example of a driving mechanism that moves a display in a case where an interval between a display and an ocular optical system is changed has been described. The present is not limited thereto, and can be applied to an embodiment in which a driving mechanism moving an ocular optical system or a driving mechanism moving both a display and an ocular optical system is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138299, filed Aug. 26 2021, and Japanese Patent Application No. 2022-003523, filed Jan. 13 2022 which are hereby incorporated by reference wherein in their entirety.

What is claimed is:

1. A display device comprising:
a plurality of display units each configured to include a display and a display optical system;
a first adjustment unit configured to change an optical positional relationship between the display and the display optical system;
a second adjustment unit configured to change an interval between the plurality of display units; and
one or more processors configured to execute the instructions, which, when executed by the one or more processors, cause the display device to:
control the first adjustment unit and the second adjustment unit, and
wherein the first adjustment unit can be moved in a direction in which the plurality of display units is lined up.

2. The display device according to claim 1, wherein the display unit includes:
a first display unit that includes a first display and a first display optical system, and
a second display unit that includes a second display and a second display optical system,
the first adjustment unit includes a first driving unit that changes an interval between the first display and the first display optical system and an interval between the second display and the second display optical system, and
the second adjustment unit includes a second driving unit that changes an interval between the first display unit and the second display unit.

3. The display device according to claim 2, wherein an interval between the first display unit and the second display unit is adjusted by integrally moving the first and second display units and the first adjustment unit.

4. The display device according to claim 1, wherein the display unit includes:
a first display unit that includes a first display and a first display optical system, and
a second display unit that includes a second display and a second display optical system, and
the first adjustment unit includes an adjustment unit performing diopter adjustment related to the first display unit and an adjustment unit performing diopter adjustment related to the second display unit.

5. The display device according to claim 1, wherein the adjustment in the second adjustment unit is performed after a diopter is changed in a direction of infinity in the first adjustment unit.

6. The display device according to claim 5, wherein a diopter is changed in a close-range direction after the diopter is changed in the direction of infinity, and an interval between the display and the display optical system corresponding to a selected position is adjusted.

7. The display device according to claim 1, wherein the second adjustment unit is disposed in a direction in which the display unit is movable and a direction orthogonal to an optical axis direction with respect to the display unit.

8. The display device according to claim 1, wherein the detector detects an interpupillary distance from image information obtained by imaging the user's eyes in an oblique direction with respect to an optical axis of the display unit.

9. The display device according to claim 1, wherein the display unit displays a video having a parallax.

10. The display device according to claim 1, wherein the display device is able to be worn on the user's head.

11. A display device comprising:
a first display unit configured to include a first display and a first display optical system, and a second display unit including a second display and a second display optical system;
a first adjustment unit configured to change an optical positional relationship between the first display and the first display optical system and an optical positional relationship between the second display and the second display optical system;
a second adjustment unit configured to change an interval between the first display unit and the second display unit; and
one or more processors configured to execute the instructions, which, when executed by the one or more processors, cause the display device to:
control the first adjustment unit and the second adjustment unit, and
wherein, in a case where a direction in which the first and second display optical systems are lined up is a first direction, the first adjustment unit is disposed on a side away from optical axes of the first and second display optical systems in the first direction, and
wherein the first adjustment unit can be moved in the first direction.

12. The display device according to claim 11, wherein the first adjustment unit includes a driving unit that changes an interval between the display and the display optical system by using a driving source generating a thrust by vibration.

13. The display device according to claim 12, wherein the driving unit includes:
a vibration member generating vibration in a contact portion,
a friction member having a friction surface in contact with the contact portion, and
a pressing unit pressing the contact portion against the friction surface,
wherein there is relative movement between the vibration member and the friction member due to vibration generated in the contact portion.

14. The display device according to claim 13, wherein the friction surface is a surface of which a normal direction is parallel to the first direction.

15. The display device according to claim 13, wherein the pressing unit and vibration member are disposed to overlap each other in the first direction when viewed from the second direction.

16. The display device according to claim 13, further comprising:
- a driven portion configured to move in an optical axis direction of the display optical system;
- a movable portion configured to move due to vibration generated in the contact portion;
- a connection member configured to connect the movable portion and the driven portion; and
- an opening configured to be provided in a surface adjacent to the driving unit in the display unit and make the connection member pass therethrough.

17. The display device according to claim 16, wherein the opening is positioned on a side in a vertically upward direction with respect to the contact portion during use.

18. The display device according to claim 16, wherein the movable portion includes the friction member.

19. The display device according to claim 13, wherein the friction member is disposed on a side closer to the display unit than the vibration member in the first direction.

20. A control method executed by a display device that displays a video by a plurality of display units each including a display and a display optical system, the control method comprising:
- changing an interval between the plurality of display units; and
- changing an optical positional relationship between the display and the display optical system using a first adjustment unit that can move in the direction in which the plurality of display units is lined up.

* * * * *